(12) United States Patent  (10) Patent No.: US 6,941,655 B1
Bisland  (45) Date of Patent: Sep. 13, 2005

(54) CANTILEVERED SAWHORSE BRACKET FOR TRUCK TAILGATE

(76) Inventor: Robert M. Bisland, 14509-85th Ct. West, Taylor Ridge, IL (US) 61284

( * ) Notice: Subject to any disclaimer, the term of this patent is extended or adjusted under 35 U.S.C. 154(b) by 0 days.

(21) Appl. No.: 10/843,848

(22) Filed: May 12, 2004

(51) Int. Cl.$^7$ .............................................. B62D 25/00
(52) U.S. Cl. ....................... 29/897.2; 296/57.1; 296/50; 182/186.5
(58) Field of Search ........................... 296/50, 51, 57.1, 296/26.08; 29/897.2; 224/403, 405, 497; 248/291.1; 182/127, 129, 181.1, 224, 186.5

(56) References Cited

U.S. PATENT DOCUMENTS

| | | | |
|---|---|---|---|
| 5,169,202 A | * | 12/1992 | Cupp et al. .................... 296/51 |
| 5,183,162 A | | 2/1993 | Ritzenthaler |
| 5,904,225 A | | 5/1999 | Patros |
| 6,123,173 A | | 9/2000 | Patros |
| 6,206,445 B1 | * | 3/2001 | Brooks ......................... 296/51 |
| 2002/0109367 A1 | * | 8/2002 | Terrusa ..................... 296/26.08 |
| 2004/0227368 A1 | * | 11/2004 | Seksaria et al. ........... 296/26.1 |

* cited by examiner

Primary Examiner—Stephen Gordon
(74) Attorney, Agent, or Firm—Sturm & Fix LLP

(57) ABSTRACT

A method and apparatus for constructing sawhorses attached to a pickup truck tailgate uses brackets that fold up and down are attached to the top surface of the tailgate when the tailgate is open. The foldable portion of each bracket is raised and a 2x4 or appropriately dimensioned rail is inserted into the bracket. A portion of the rail extends beyond the back of the tailgate so boards and other construction paraphernalia may be placed on the rails.

3 Claims, 2 Drawing Sheets

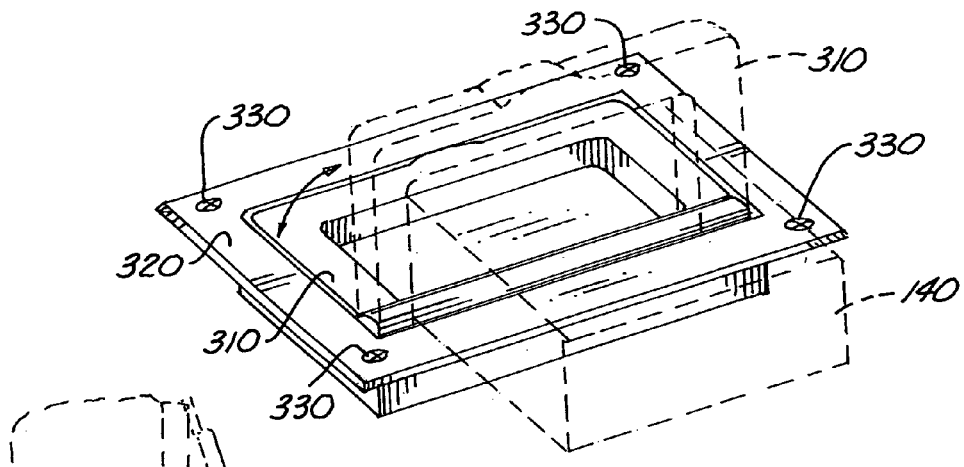
Fig. 3
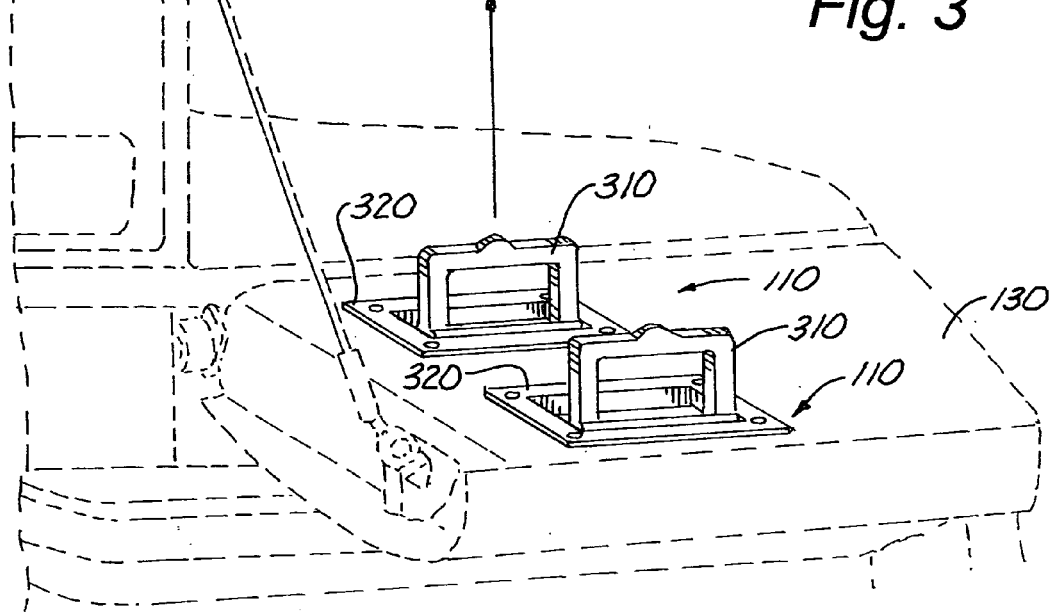
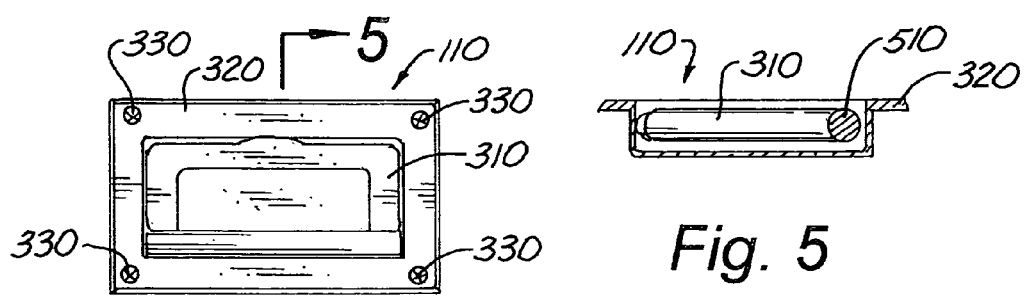
Fig. 4
Fig. 5

CANTILEVERED SAWHORSE BRACKET FOR TRUCK TAILGATE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to construction equipment. More particularly the present invention relates to a system for constructing sawhorses with a tailgate of a pickup truck and some dimensional lumber.

2. Background Art

Sawhorses are indispensable tools for carpenters and other construction workers. The style of sawhorse used for decades by carpenters across the nation typically comprises four legs angularly and rigidly attached to a top rail that is substantially horizontal in use. The majority of the structure is of wood.

In both U.S. Pat. Nos. 6,123,173 and 5,904,225, Patros discloses an extendable sawhorse top rail. A stationary part of the top rail has a dovetailed groove and the extension is trapezoidal shaped to fit in the dovetailed groove. The remainder of the sawhorse is conventional.

However, the traditional sawhorse, made sufficiently sturdy for a professional carpenter, is a large and cumbersome item. They require significant storage space for transport in a pickup and are sometimes inconvenient to carry for small repair jobs.

There is, therefore, a need for a method and apparatus by which a pickup truck tailgate may be pressed into service as a sawhorse.

BRIEF SUMMARY OF THE INVENTION

An object of the present invention is to provide a method and apparatus for fashioning a set of saw horses out of a pickup truck tailgate and some dimensional lumber.

To effect this object, brackets similar to the handles used on galvanized steel garbage cans or those used on burial caskets are attached to the front (when closed) surface of the pickup truck tailgate, preferably such that the bracket is flush with the front surface of the tailgate when the bracket is folded down. When the tailgate is open and lying substantially horizontal, the brackets, preferably four (4), two on each end of the tailgate, are also on a plane that is substantially horizontal.

With the tailgate in the "down," or open, position, the brackets are each raised and a length of 2×4 (or other suitable dimensional lumber) is slid into two brackets, both residing on an end of the tailgate. The 2×4 now lies parallel to the direction of travel when the pickup is moving and the wide sides of the 2×4 lie in substantially horizontal planes. An additional 2×4 is placed in the other pair of brackets at the other end of the tailgate. With both 2×4s extending to the rear of the pickup past the rearmost portion of the laid-down tailgate, the sawhorses are ready for use. The extent to which the 2×4s must extend behind the tailgate depends on the use of the sawhorses. Note that the length of the 2×4s is very flexible because they can be pushed further into the bed of the pickup to make the cantilevered portion shorter, or pulled from the pickup bed to make the cantilevered portion longer. In this way, 2×4s as long as twelve feet and as short as three feet may serve as rails.

When not it use, whether the tailgate is open or closed, the brackets are made to fold down to be substantially flush with the surface of the tailgate to which they are mounted. In this way, the brackets are not in the way for normal use of the pickup truck.

Other objects, advantages and novel features of the present invention will become apparent from the following detailed description of the invention when considered in conjunction with the accompanying drawings.

BRIEF DESCRIPTION OF THE SEVERAL VIEWS OF THE DRAWINGS

FIG. 3 is a second perspective view of the pickup truck tailgate with sawhorse brackets attached thereto, the sawhorse brackets being folded up, and a detail of the sawhorse bracket;

FIG. 4 is a top plan view of the sawhorse bracket; and

FIG. 5 is a side elevation view of the sawhorse bracket.

DETAILED DESCRIPTION OF THE INVENTION

Figure 1:
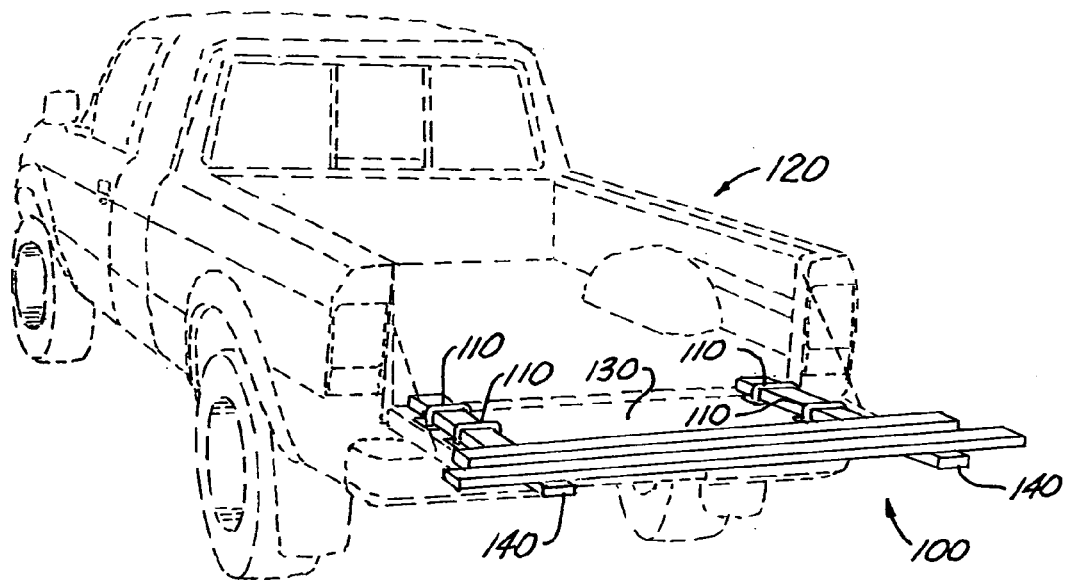
FIG. 1 is a perspective view of a pickup truck with open tailgate and sawhorse brackets attached thereto, dimensional lumber being engaged in the sawhorse brackets.

The sawhorses 100 of the present invention are shown in use in FIG. 1. A pair of sawhorse brackets 110 is installed near a left-hand end of the pickup truck 120 tailgate 130, the left-hand end being determined when sitting in the driver's seat facing forward. Another pair of sawhorse brackets 110 is installed near a right-hand end of the pickup truck 120 tailgate 130. A distance between these two pairs of sawhorse brackets 110 is determined by the user based on common uses of the resulting sawhorses 100.

A 2×4 or other suitably sized length of lumber rail 140 is inserted into the pair of sawhorse brackets 110 on the left-hand side of the tailgate 130 such that the rail 140 extends beyond the trailing edge of the open tailgate 130 an amount suitable to the task at hand. For instance, if the purpose of the sawhorses 100 is for cutting 2×4 studs to length, only a foot or so of cantilever is required; whereas if a 4×8 sheet of plywood is to be handled, the cantilevered portion of the rails 110 should be on the order of two to four feet.

Similarly, a 2×4 or other suitably sized length of lumber rail 140 is inserted into the pair of sawhorse brackets 110 on the right-hand side of the tailgate 130.

Figure 2:
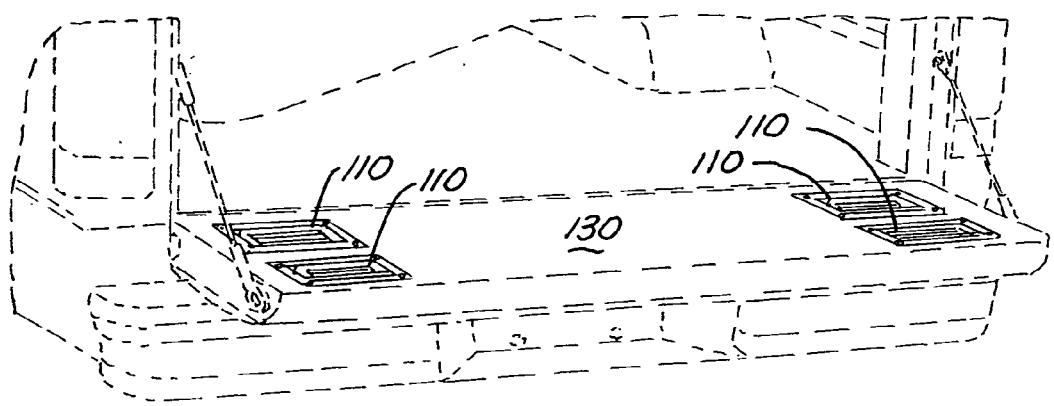
FIG. 2 is a first perspective view of the pickup truck tailgate with sawhorse brackets attached thereto, the sawhorse brackets being folded down.

The brackets 110 are shown in a closed position in FIG. 2. In this position, the entire bracket 110 would preferably be flush with or lower than the top surface of the open tailgate 130.

The left-hand pair of sawhorse brackets 110 is shown in FIG. 3, mounted on a pickup truck 120 tailgate 130 which is in an open position. The sawhorse brackets 110 in the lower part of FIG. 3 are shown in a raised position. The foldable portion 310 is positioned in a substantially vertical plane in this raised position. The same foldable portion 310 is shown both in a raised position (in dashed lines) and a lowered position (in solid lines) in the upper portion of FIG. 3.

A base 320 is recessed into and firmly attached to the tailgate 130 as shown in FIG. 3. Fasteners 330 such as screws or rivets hold the base 320 rigidly affixed to the tailgate 130. Other fastening methods are possible, such as welding, brazing, and forming the base 320 when the tailgate 130 is formed. The present invention is not limited to a particular method of fastening.

In FIGS. 4 and 5, a lowered sawhorse bracket 110 is shown in two different views. A hinge 510 on which the foldable portion 310 pivots is clearly seen in the side elevation view of FIG. 5. The hinge engages the base 320 so that the foldable portion 310 of the sawhorse bracket 110 is preferably pivotally attached to the base 320.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A method of constructing sawhorses, said sawhorses comprising a pickup truck tailgate, dimensional lumber, and a plurality of sawhorse brackets, the sawhorse brackets each comprising a base and a foldable portion, said foldable portion made to receive the dimensional lumber, the method comprising:
   (a) installing the plurality of sawhorse brackets to the pickup truck tailgate;
   (b) opening the pickup truck tailgate;
   (c) placing the foldable portions of the plurality of sawhorse brackets in a raised position; and
   (d) inserting the dimensional lumber into the plurality of sawhorse brackets such that the dimensional lumber extends behind the pickup truck tailgate.

2. The method of claim 1 wherein the step of installing the plurality of sawhorse brackets comprises:
   (a) installing two sawhorse brackets on a left-hand side of the pickup truck tailgate, one in front of another in a direction of travel and as seen with the pickup truck tailgate in an open position; and
   (b) installing two sawhorse brackets on a right-hand side of the pickup truck tailgate, one in front of another in a direction of travel and as seen with the pickup truck tailgate in an open position.

3. The method of claim 1 wherein the step of installing the plurality of sawhorse brackets comprises recessing the plurality of sawhorse brackets such that all components of the sawhorse brackets are flush with or lower than a top surface of the pickup truck tailgate when said pickup truck tailgate is in an open position and when the foldable portions of the sawhorse brackets are in a lowered position.

* * * * *